(12) United States Patent
Tsai et al.

(10) Patent No.: US 11,346,788 B2
(45) Date of Patent: May 31, 2022

(54) FLUORESCENCE IMAGING OF GEMSTONE ON TRANSPARENT STAGE

(71) Applicant: Gemological Institute of America, Inc. (GIA), Carlsbad, CA (US)

(72) Inventors: Tsung-Han Tsai, Little Ferry, NJ (US); Wuyi Wang, Edison, NJ (US)

(73) Assignee: Gemological Institute of America, Inc. (GIA), Carlsbad, CA (US)

(*) Notice: Subject to any disclaimer, the term of this patent is extended or adjusted under 35 U.S.C. 154(b) by 7 days.

(21) Appl. No.: 17/105,065

(22) Filed: Nov. 25, 2020

(65) Prior Publication Data

US 2021/0156807 A1    May 27, 2021

Related U.S. Application Data

(60) Provisional application No. 62/940,871, filed on Nov. 26, 2019.

(51) Int. Cl.
*G01N 21/87* (2006.01)
*G01N 21/64* (2006.01)

(52) U.S. Cl.
CPC ......... *G01N 21/87* (2013.01); *G01N 21/6456* (2013.01)

(58) Field of Classification Search
CPC ............. G01N 21/6428; G01N 33/582; G01N 21/6452; G01N 2021/6419;
(Continued)

(56) References Cited

U.S. PATENT DOCUMENTS 5,536,943 A  7/1996  Smith et al.
5,811,817 A  9/1998  Ravich
(Continued)

FOREIGN PATENT DOCUMENTS

CN  101263381 A  9/2008
CN  105352929 A  2/2016
(Continued)

OTHER PUBLICATIONS

Girolami et al.; "Diamond Detectors for UV and X-Ray Source Imaging" Library Genesis, booksdescr.org, IEEE Electron Device Letters, vol. 33, No 2, Feb. 2012, 4 pages. https://www.researchgate.net/publication/235662050_Diamond_Detectors_for_UV_and_X-Ray_Source_Imaging.

(Continued)

*Primary Examiner* — Michael P Stafira
(74) *Attorney, Agent, or Firm* — DLA Piper LLP (US)

(57) ABSTRACT

Systems and methods here may be used for a setup of fluorescence image capturing of a gemstone, such as a diamond placed on a flat stage. Some examples utilize a setup that both sends light and captures the image from the table side of the gemstone by passing ultraviolet (UV) light between 10 nm and 400 nm to the gemstone and capturing the excited fluorescence image for analysis through a dichroic beam splitter. In some examples, the cutoff is 300 nm. The dichroic beam splitter arrangement allows for the camera to focus on the same interface of the stage and gemstone over and over for ease of use and without moving, changing, or adjusting the equipment for different samples.

22 Claims, 7 Drawing Sheets
(2 of 7 Drawing Sheet(s) Filed in Color)

(58) Field of Classification Search
CPC ..... G01N 2015/149; G01N 2021/6441; G01N
2201/0627; G01N 2021/6421; G01N
2201/0628; G01N 21/6458; G01N
2021/6432; G01N 2021/6439; G01N
2021/6482; G01N 21/6456; G01N 21/64;
G01N 2201/062; G01N 2015/1486; G01N
27/44721; G01N 30/02; G01N 21/274;
G01N 15/1456; G01N 21/6408; G01N
15/1459; G01N 15/1463; G01N
2021/6463; G01N 21/645; G01N
21/6486; G01N 2015/1497; G01N
2500/00; G01N 33/5008; G01N 30/00;
G01N 21/6402; G01N 2201/0245; G01N
2201/0635; G01N 2201/0612; G01N
21/552; G01N 21/65; G01N 2021/6471;
G01N 2021/6478; G01N 2021/6484;
G01N 2021/772; G01N 2021/7733; G01N
2021/775; G01N 2021/7759; G01N
2021/7786; G01N 21/7703; G01N
2333/4724; G01N 33/66; G01N 21/6489;
G01N 33/542; G01N 21/45; G01N
21/6445; G01N 2201/068; G01N 33/502;
G01N 33/505; G01N 15/1436; G01N
15/1475; G01N 2015/144; G01N
2021/6417; G01N 2035/00158; G01N
21/87; G01N 2201/06113; G01N
2201/129; G01N 24/10; G01N 2800/52;
G01N 33/5082; G01N 33/54306; G01N
33/573; G01N 2021/3595; G01N 21/474;
G01N 21/55; G01N 2510/00; G01N
33/5014; G01N 33/5091; G01N
35/00069; G01N 2021/6434; G01N
2201/08; G01N 2333/90216; G01N
2500/04; G01N 33/483; G01N 33/5011;
G01N 33/5432; G01N 33/54386; G01N
33/6845; G01N 2015/008; G01N
2015/1006; G01N 2021/4764; G01N
2021/4769; G01N 21/0303; G01N
21/0332; G01N 21/4738; G01N 21/643;
G01N 21/80; G01N 2201/06; G01N
33/5044; G01N 33/5067; G01N 33/5076;
G01N 33/5094; G01N 33/54366; G01N
33/57419; G01N 33/6887; G01N
15/1031; G01N 15/14; G01N 15/1484;
G01N 2015/0038; G01N 2015/0073;
G01N 2021/0385; G01N 2021/0389;
G01N 2021/8477; G01N 21/03; G01N
21/31; G01N 21/88; G01N 2201/0846;
G01N 2201/10; G01N 2333/912; G01N
33/5032; G01N 33/54313; G01N
33/57484; G01N 33/68; G01N 2021/015;
G01N 2021/1738; G01N 2035/00326;
G01N 21/255; G01N 21/27; G01N 21/35;
G01N 21/3563; G01N 21/3577; G01N
21/3581; G01N 21/47; G01N 21/648;
G01N 21/658; G01N 21/75; G01N
2201/0636; G01N 2201/0638; G01N
2333/161; G01N 2333/59; G01N
2333/924; G01N 2440/36; G01N
2800/26; G01N 33/54393; G01N 33/552;
G01N 33/557; G01N 33/558; G01N
33/588; G01N 33/6893; G01N 1/40;
G01N 15/1434; G01N 15/1468; G01N
2015/0693; G01N 2015/1454; G01N
2015/1472; G01N 2021/0325; G01N
2021/0378; G01N 2021/1787; G01N
2021/656; G01N 2035/00495; G01N
2035/00564; G01N 2035/00574; G01N
2035/0091; G01N 2035/0451; G01N
21/07; G01N 21/4795; G01N 21/553;
G01N 21/554; G01N 21/63; G01N
21/6447; G01N 21/76; G01N 22/00;
G01N 2201/061; G01N 2333/62; G01N
2800/042; G01N 2800/16; G01N
2800/50; G01N 33/381; G01N 33/54346;
G01N 33/54373; G01N 33/57407; G01N
33/6878; G01N 33/74; G01N 33/84;
G01N 35/00029; G01N 35/00871; G01N
35/0098; G01N 35/028
See application file for complete search history.

(56) References Cited

U.S. PATENT DOCUMENTS

| | | | |
|---|---|---|---|
| 5,811,824 A | 9/1998 | Smith et al. | |
| 5,883,389 A | 3/1999 | Spear et al. | |
| 6,331,708 B2 | 12/2001 | Smith | |
| 6,407,810 B1 | 6/2002 | Liu et al. | |
| 6,980,283 B1 | 12/2005 | Aggarwal | |
| 7,411,663 B2 | 8/2008 | Van de Velde et al. | |
| 9,157,859 B2 | 10/2015 | Walsworth et al. | |
| 9,222,893 B2 | 12/2015 | Homabrook et al. | |
| 9,766,181 B2 | 9/2017 | Englund et al. | |
| 9,945,791 B2 | 4/2018 | Paleari et al. | |
| 9,958,398 B2* | 5/2018 | Davies | G01N 21/65 |
| 10,036,711 B2 | 7/2018 | Palmieri et al. | |
| 10,054,550 B2 | 8/2018 | Gu | |
| 10,107,757 B2 | 10/2018 | Takahashi | |
| 10,132,474 B2 | 11/2018 | Bock et al. | |
| 10,168,282 B2 | 1/2019 | Song | |
| 2005/0117145 A1 | 6/2005 | Altman et al. | |
| 2007/0296954 A1 | 12/2007 | Geurts | |
| 2008/0006615 A1* | 1/2008 | Rosario | C04B 41/0045 |
| | | | 219/121.68 |
| 2008/0218730 A1 | 9/2008 | Sasian et al. | |
| 2008/0225266 A1 | 9/2008 | Van De Velde et al. | |
| 2008/0231833 A1 | 9/2008 | Shlezinger et al. | |
| 2011/0310246 A1 | 12/2011 | Homabrook et al. | |
| 2013/0060106 A1* | 3/2013 | Aasmul | G01N 21/7703 |
| | | | 600/316 |
| 2016/0078028 A1 | 3/2016 | Pawlik et al. | |
| 2016/0232432 A1 | 8/2016 | Regev | |
| 2017/0370855 A1 | 12/2017 | Takahashi | |
| 2018/0172599 A1 | 6/2018 | Wang et al. | |
| 2021/0366688 A1* | 11/2021 | Wang | G02B 27/58 |

FOREIGN PATENT DOCUMENTS

| | | | | |
|---|---|---|---|---|
| CN | 205643160 U | 10/2016 | | |
| CN | 206627443 U | 11/2017 | | |
| CN | 108956576 A | 12/2018 | | |
| DE | 102017211031 A1 * | 5/2018 | ........... | G02B 21/008 |
| GB | 2551133 A | 12/2017 | | |
| GB | 2577928 A * | 4/2020 | ............ | G01N 21/88 |
| KR | 20130039744 A | 4/2013 | | |
| WO | WO9934197 A1 | 7/1999 | | |
| WO | WO9957544 A1 | 11/1999 | | |
| WO | WO03 070043 A2 | 8/2003 | | |
| WO | WO2017001835 A1 | 1/2017 | | |
| WO | WO201721223 8 A1 | 12/2017 | | |
| WO | WO-2018083690 A1 * | 5/2018 | ............ | G01N 21/87 |
| WO | WO-2019162666 A1 * | 8/2019 | ............ | G01N 21/87 |

OTHER PUBLICATIONS

DiamondView, International Institute of Diamond Grading Research, iidgr.com, dated Oct. 17, 2016, 8 pages. https://web.archive.org/

(56) References Cited

OTHER PUBLICATIONS web/20161017203952/https://www.iidgr.com/innovation/diamondview/.

"GIA Develops 100% Accurate Synthetic Diamond Detector", Internet Stones.com, internetstones.com, Feb. 3, 2014, 2 pages. https://web.archive.org/web/20140203020825/https://news.internetstones.com/gia-develops-100-accurate-synthetic-diamond-detector.

"GIA DiamondCheck™", Aug. 24, 2017, 1 page. https://web.archive.org/web/20170824104002/http://store.gia.edu/DiamondCheck-p/215000.htm.

\* cited by examiner

CVD layer overgrowth on natural diamond

Natural diamond's growth pattern

FLUORESCENCE IMAGING OF GEMSTONE ON TRANSPARENT STAGE

CROSS REFERENCE TO RELATED APPLICATION

This application claims priority to U.S. Provisional Application No. 62/940,871 filed on 26 Nov. 2019, the entirety of which is hereby incorporated by reference. This application is also related to International Application No. PCT/US2020/062249 filed on 25 Nov. 2020.

FIELD

The field includes utilizing fluorescence image capture for analyzing a diamond or other gemstone positioned on a stage.

BACKGROUND

The need for a systematic and easily reproducible analyzing method is needed for gemstones. Current technologies rely on aiming illumination into a diamond or stones pavilion. This method requires cumbersome aiming of the illumination source on a part of a stone which may be different depending on the stones size and shape. The method may not be easily reproduced or replicated due to aiming constraints and parameters. Further, using this method, additional hardware may be necessary to aim, adjust, or focus an imaging or illumination source on a gemstone. That is because auto-focusing on a gemstone is difficult. Polished gem facets are difficult to auto-focus on because the surfaces are lacking definable and identifiable features for the camera and software to analyze and focus.

Other example systems utilize gemstone holders that are needed to position the gemstone under evaluation at a particular angle, and hold it there while imaged.

Other example systems utilize components that require spread out components which are not capable of being configured into a compact unit.

The systems and methods here provide for technical solutions to this technical problem using an easily reproducible setup that allows a user to place and analyze a stone with minimal adjustments, from stone-to-stone.

SUMMARY

Systems and methods here may be used to provide a method to analyze a gemstone, specifically fluorescence image, such as a diamond, in an easily reproducible arrangement that minimizes adjustments between target stones and yet produces reliable results.

In some examples, alternatively or additionally, systems and methods of capturing and analyzing fluoresce images of a sample gemstone, include generating a fluorescence exciting beam, directing the fluorescence exciting beam through a filter and to a dichroic beam splitter, wherein the dichroic beam splitter is configured to reflect wavelengths of the fluorescence exciting beam and pass wavelengths of excited fluorescence from the sample gemstone, receiving, at a camera with a computer processor and a memory, an excited fluorescence image from the sample gemstone resting table-side down on a sapphire stage, wherein the excited fluorescence image having passed through the dichroic beam splitter, digitizing, by the camera computer, the received fluorescence image of the sample gemstone, and sending, by the camera computer, the digitized image of the sample gemstone table to a computer data storage. In some examples, alternatively or additionally, further comprising, by a back end computer with a processor and a memory, comparing a second digitized image to the stored digitized image and determining a match for identification. In some examples, alternatively or additionally, further comprising, analyzing, by a back end computer with a processor and a memory, the stored digitized image for determination of whether the sample gemstone is a natural or synthetic diamond. In some examples, alternatively or additionally, the directed, filtered beam has a wavelength of between 200 nm and 250 nm. In some examples, alternatively or additionally, the directed, filtered beam has a wavelength of about 224 nm. In some examples, alternatively or additionally, the generating of a fluorescence beam is by a Xe flash lamp. In some examples, alternatively or additionally, the excited fluorescence image from the sample gemstone resting table-side down on a sapphire stage has a wavelength between 400 nm and 700 nm. In some examples, alternatively or additionally, the comparing of the second digitized image to the stored digitized image and determining a match for identification is a comparison of a subset of pixels in the full digitized images. In some examples, alternatively or additionally, the excited fluorescence image from the sample gemstone resting table-side down on a sapphire stage, is also reflected off a mirror before being received at the camera and after passing through the dichroic beam splitter. In some examples, alternatively or additionally, the dichroic beam splitter is configured to reflect wavelengths less than 300 nm and pass wavelengths greater than 300 nm. In some examples, alternatively or additionally, the filter through which the fluorescence exciting beam is filtered includes a polarization sensitive filter.

Systems and methods here may include analyzing fluoresce images of a sample gemstone, including a light generator for creating a beam capable of exciting fluorescence in a gemstone, a dichroic beam splitter, configured to reflect wavelengths from the light generator and pass wavelengths from fluorescence excitation of the sample gemstone, wherein a lens and a filter are configured to focus and filter the beam from the light generator which is aimed at the dichroic beam splitter, a flat stage capable of transmitting both ultraviolet and visible light, the flat stage configured to support a table of the sample gemstone and receive reflected beams from the dichroic beam splitter, a camera configured to focus on an interface of the table of the sample gemstone and the flat stage, and receive excited fluorescence images from the sample gemstone table through the dichroic beam splitter and generate a digitized image of the sample gemstone table. In some examples, alternatively or additionally, the beam created by the light generator has a wavelength of between 200 nm and 250 nm. In some examples, alternatively or additionally, the beam created by the light generator has a wavelength of about 224 nm. In some further examples, a computer system in communication with the camera wherein the computer system is configured to receive and store the digitized image of the sample gemstone table. In some examples the computer system is further configured to determine whether the sample gemstone table is natural or synthetic based on the digitized image. In some examples, alternatively or additionally, the computer system is further configured to compare the digitized image of the sample gemstone table with stored digitized images of other gemstone tables and determine a match for identification based on compared pixels in the images. In some further examples, a mirror, configured between the camera and the dichroic beam splitter, the mirror configured to reflect the excited fluorescence images into the camera. In some examples, alternatively or additionally, the dichroic beam splitter is configured to reflect wavelengths less than 300 nm and pass wavelengths greater than 300 nm. In some further examples, a polarization sensitive filter configured to filter the light beam from the light generator. In some examples, alternatively or additionally, the sample gemstone is backed by a light absorbing material to reduce reflections. In some examples, alternatively or additionally, the computer may be used for analyzing the digitized image for color variation and boundary color detection to identify a synthetic overgrowth.

BRIEF DESCRIPTION OF DRAWINGS

The patent or application file contains at least one drawing executed in color. Copies of this patent or patent application publication with color drawing(s) will be provided by the Office upon request and payment of the necessary fee.

For a better understanding of the embodiments described in this application, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the particular embodiments. In other instances, well-known data structures, timing protocols, software operations, procedures, and components have not been described in detail so as not to unnecessarily obscure aspects of the embodiments herein.

Overview

Systems and methods here may be used for a setup of fluorescence image capturing of a gemstone, such as a diamond placed on a flat stage. Some examples utilize a setup that both sends light and captures the image from the table side of the gemstone by passing ultraviolet (UV) light between 10 nm and 400 nm to the gemstone and capturing the excited fluorescence image for analysis through a dichroic beam splitter. In some examples, alternatively or additionally, the dichroic beam splitter wavelength cutoff is 300 nm. The dichroic beam splitter arrangement allows for the camera to focus on the same interface of the stage and gemstone over and over for ease of use and without moving, changing, or adjusting the equipment for different samples.

Example Method Steps

Figure 1:
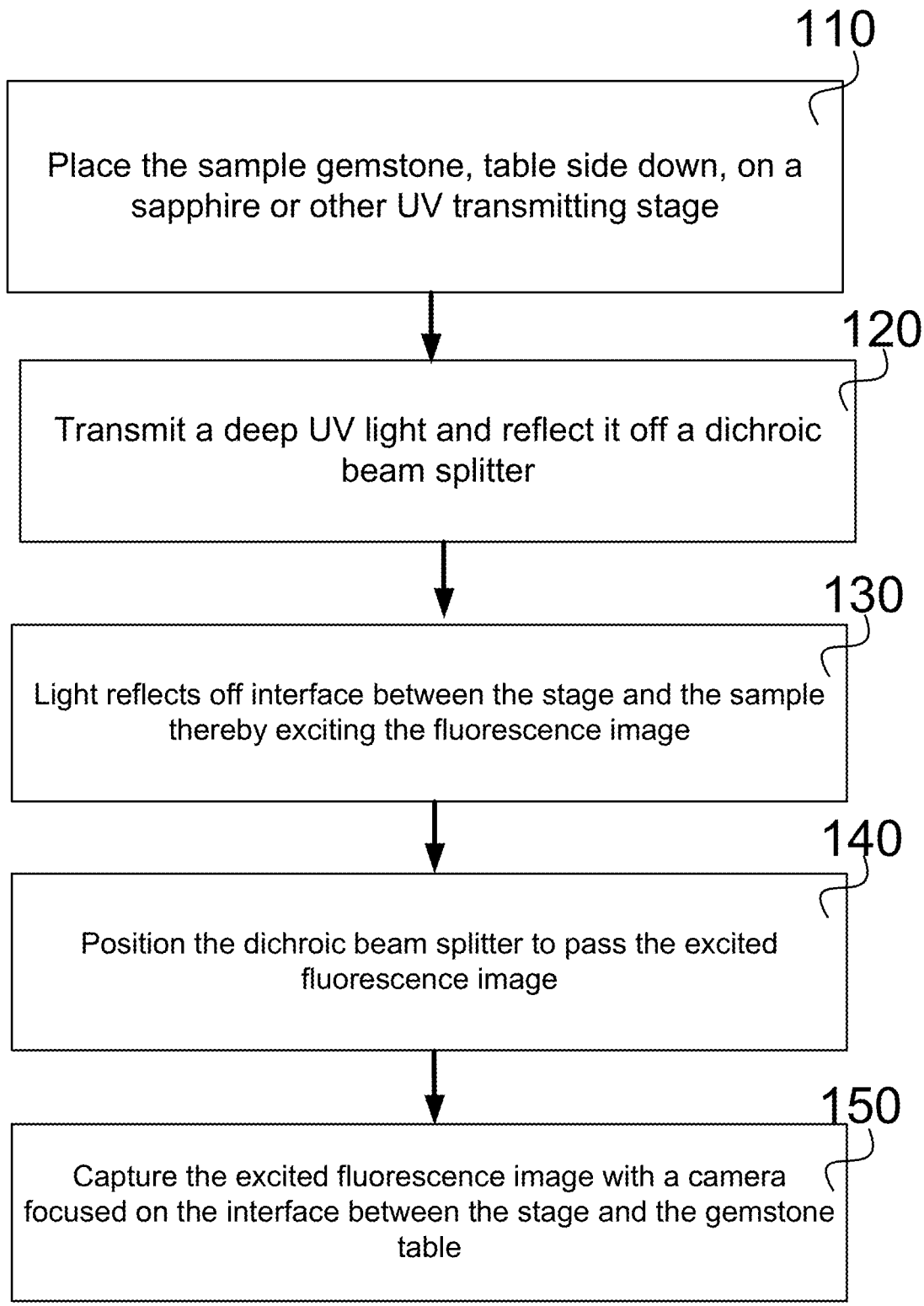
FIG. 1 is an illustration of an example flow diagram in accordance with certain aspects described herein.

FIG. 1 depicts an example flow chart detailing examples of the how the systems and methods described herein may capture the excited gemstone fluorescence image for analysis. The first example step as shown in FIG. 1 is to 110 place the sample gemstone on a stage that is capable of transmitting UV to visible light. The stage should be able to transmit wavelengths of the excitation light source and fluorescence image, as described below. In some examples, alternatively or additionally, the UV transmitting stage is made of sapphire. In some examples, alternatively or additionally, the UV transmitting stage is made of quartz. In some examples, alternatively or additionally, the gemstone may be placed table side down on the stage. (See explanation of FIG. 3 for an example showing a cut gemstone table 378.)

As the largest flat portion of a cut gemstone, the table may be the easiest and most stable portion of a gemstone to place on a flat surface, such as the stage. No holder or support other than the stage is needed in this arrangement. Different sized gemstones may all be set in the same place, with no adjustments, and with no preparation by a user. The stage is flat and the gemstone table is flat, thereby allowing a user to easily swap and move samples, repeat the process without any risk of misalignment or errant focusing. Such an arrangement creates an interface where the gemstone table interfaces with the stage in the same way at the same time, every time an analysis is performed.

It should be noted that the gemstone "table" is used here to describe a flat and stable portion of the gemstone upon which it may rest on another flat surface such as a stage. However, In some examples, alternatively or additionally, a gemstone may be cut in such a way that another flat portion may be used. Thus, in this description, the term "table" is not intended to be limiting and could be any flat portion of a gemstone under consideration and analysis.

Next, 120, a light is generated by a light source. In some examples, alternatively or additionally, the light source could be xenon flash lamp, a deuterium lamp, or a 224.3 nm HeAg laser, or any other kinds of lasers or light sources capable of producing wavelengths less than 225 nm. In some examples, alternatively or additionally, the light source is first sent through a lens to concentrate the beam spot. In some examples, alternatively or additionally, the light is sent through a deep UV filter. In some examples, alternatively or additionally, an additional polarization sensitive (combination of polarizer and waveplate) filter may be used. The wavelength of the light may be less than 224 nm as it exits the light source/lens/filter and is sent toward a dichroic beam splitter. The dichroic beam splitter is configured to reflect light at a certain wavelength band and pass light at a different wavelength band. In some examples, alternatively or additionally, the dichroic beam splitter may reflect light at wavelengths between 10 nm-400 nm. This light being less than 224 nm reflects off the dichroic beam splitter and toward the gemstone table positioned on the stage.

Next, 130 the light beam then hits the gemstone table sitting on the sapphire stage and excites fluorescence light between 400 nm and 700 nm. That fluorescence light image from the gemstone passes back through the stage toward the dichroic beam splitter.

Next, 140, the dichroic beam splitter is positioned to pass the excited fluorescence light image from the gemstone. As the wavelength of the excited fluorescence is between 400 nm and 700 nm it is able to pass through the dichroic beam splitter instead of reflect off, as the deep UV light from the originally generated deep UV light did. This excited fluorescence image may be optionally reflected off a mirror toward an imaging system such as a camera.

Finally, 150, an imaging system may be used to capture the excited fluorescence image. In some examples, alternatively or additionally, the imaging system is a light sensitive digital color camera. In some examples, alternatively or additionally, the camera may be a monochrome camera which may be used to enhance pattern detection. In some examples, alternatively or additionally, the camera is a light sensitive color camera. In some examples, alternatively or additionally, a lens is used before the camera to concentrate the beam spot of the excited fluorescence image. In some examples a filter may be used between the mirror and the imaging lens. In such examples, the filter may be used to enhance the contrast pattern or feature of the gemstone fluorescence image. In such examples, the filter may be a long pass filter, a band-pass filter, a short-pass filter, or a polarization sensitive filter (combination of polarizer and waveplate). Any combination or permutation of the above camera features and/or filter features may be used.

In such an arrangement, the camera may be able to focus on the stage/gemstone table interface to capture fluorescence images. In some examples, alternatively or additionally, this focal point may be the gemstone table where it rests on the stage. In some examples, alternatively or additionally, to help the camera focus on the interface of the stage, a fine printed or lithography patterned plate may be placed on the stage, and the camera may focus on the finely patterned plate. Such a patterned plate may be made of any material, such as glass, plastic, or metal. Such a plate may include a symbol, pattern, or writing on the plate which may be solid or reflect light such that the camera arrangement may focus on the plate, instead of try and focus on the transparent table stage. Once the camera focus is set, the plate may be removed and this same focal point may then be used for the gemstones under analysis, without any adjustments, over and over, for many samples. In such examples, the view angle of the fluorescence image may be arranged such that it is always at the same angle because the gemstone table is resting on the flat surface of the stage. In some examples, alternatively or additionally, this may be a perpendicular angle from the image beam to the gemstone table.

Using this arrangement, such a method is highly repeatable with ease-of-use for an operator who only needs to place the flattest portion of the gemstone, the table, on the stage. This allows for a fixed focal plane on the interface. The operator has no need to re-focus the system as the same interface between the gemstone table and the stage is always used, for each sample.

Hardware Setup Examples

Figure 2A:
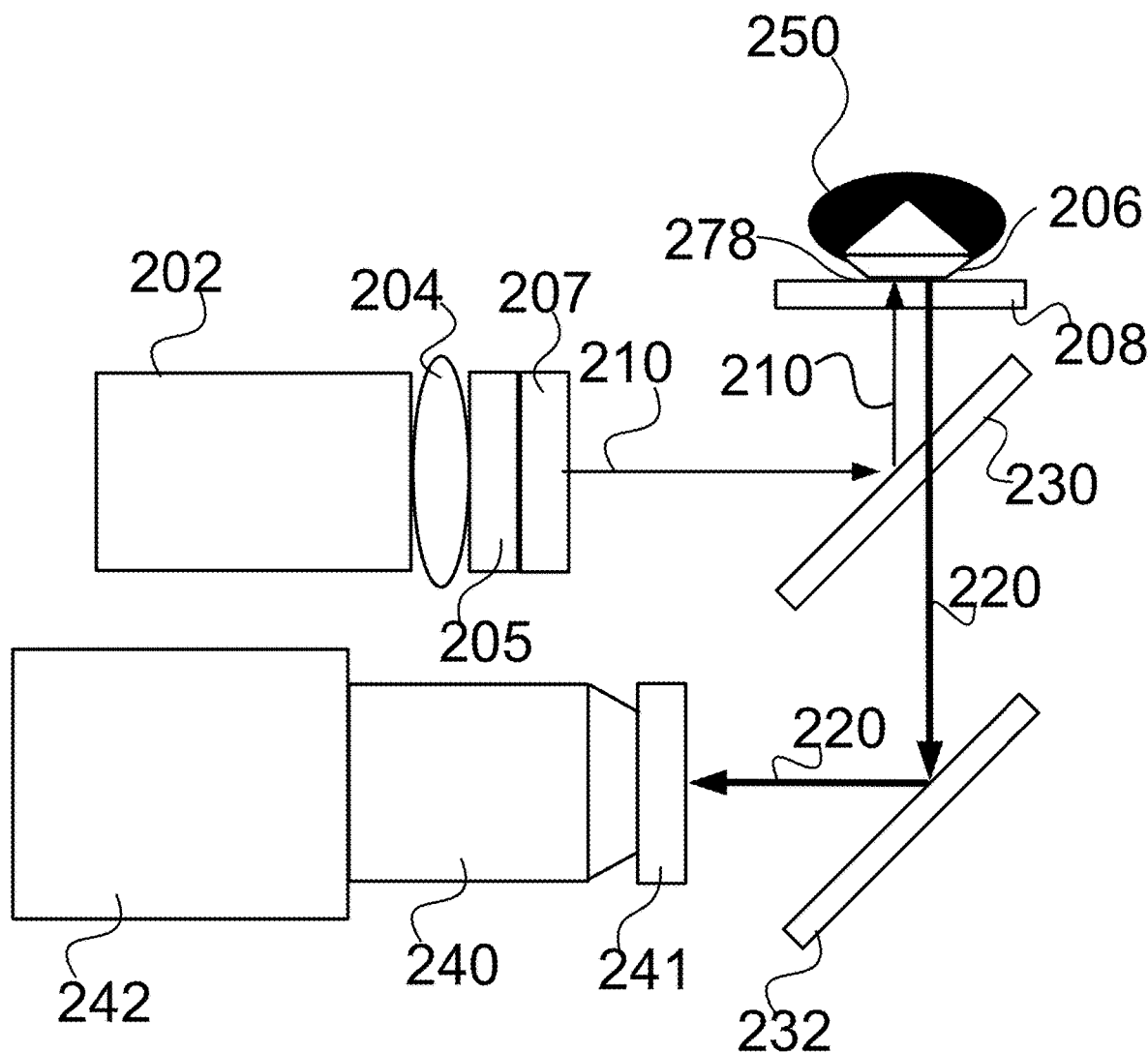
FIG. 2A is an illustration of an example analysis system in accordance with certain aspects described herein.

FIG. 2A shows an example hardware setup of the equipment which may be utilized to employ the methods described in FIG. 1 or otherwise herein. In the example FIG. 2A a light source 202 is positioned to emit a light beam 210. In some examples, alternatively or additionally, the light source 202 is a Xenon (Xe) flash lamp. In some examples, alternatively or additionally, the light source 202 is a laser driven light source (LDLS). In some examples, alternatively or additionally, the light source 202 may be a deuterium lamp. In some examples, alternatively or additionally, the light source 202 may be a 224.3 nm HeAg laser. Any combination or permutation of light source described here or otherwise may be used. In some examples, alternatively or additionally, a lens 204 may be positioned adjacent to the light source 202 to focus emitted light into a focused beam with sufficient strength to meet the illumination goals of the method. In some examples, alternatively or additionally, a filter 205 may be positioned adjacent to the light source 202 and lens 204. In some examples, alternatively or additionally, this filter 205 may be a deep UV filter allowing only deep UV light to pass. In some example embodiments, the wavelength of the light beam 210 after the lens and UV filter is less than 224 nm. In some examples, alternatively or additionally, an optional additional filter may be utilized after the filter 205, in such cases, such additional filter 207 may be a polarization sensitive filter. In some examples, alternatively or additionally, the polarization filter 207 may be a combination of a polarizer and a waveplate. Such additional filter 207 may enhance the contrast of the pattern or feature in a gemstone fluorescence image.

In some examples, alternatively or additionally, as shown, the light beam 210 emitted from the light source 202 is aimed at a dichroic beam splitter 230. A dichroic beam splitter 230 may be used to reflect certain bands of light wavelengths and allow other bands of light wavelengths to pass. In some examples, alternatively or additionally, the dichroic beam splitter 230 may reflect light with wavelengths less than 300 nm and allow light with wavelengths greater than 300 nm to pass. In some examples, alternatively or additionally, the excitation wavelength is between 10 nm and 400 nm.

In the example of FIG. 2A, the emitted light beam 210 is reflected off the dichroic beam splitter 230 and toward a stage 208. The stage 208 maybe sapphire or quartz, or any other material that is transparent to both ultraviolet (UV) and visible light and include the range between a light source that excites fluorescence in a gemstone and the fluorescence image coming from such gemstone. The stage 208 may be flat in order to allow sample gemstones 206 to be placed on it. In the example, the stage 208 is the surface upon which the sample or target gemstone 206 is placed. In some examples, alternatively or additionally, the stage the gemstone 206 may be placed table-side 278 down on the stage 208 (see FIG. 3 for an explanation of cut gemstone parts and a table 378). In some examples, alternatively or additionally, the stage 208 may include a pre-arranged area to which the camera 242 field-of-view is set. In this pre-arranged area on the stage 208, the samples 206 for analysis may be placed, thereby being included in the camera 242 field-of-view. In some examples, alternatively or additionally, this area on the stage 208 may be visibly marked for ease of use by an operator. For example, a visible circle may be etched, painted, or otherwise labeled on the stage 208 within which, the camera 242 field-of-view lies.

Figure 3:
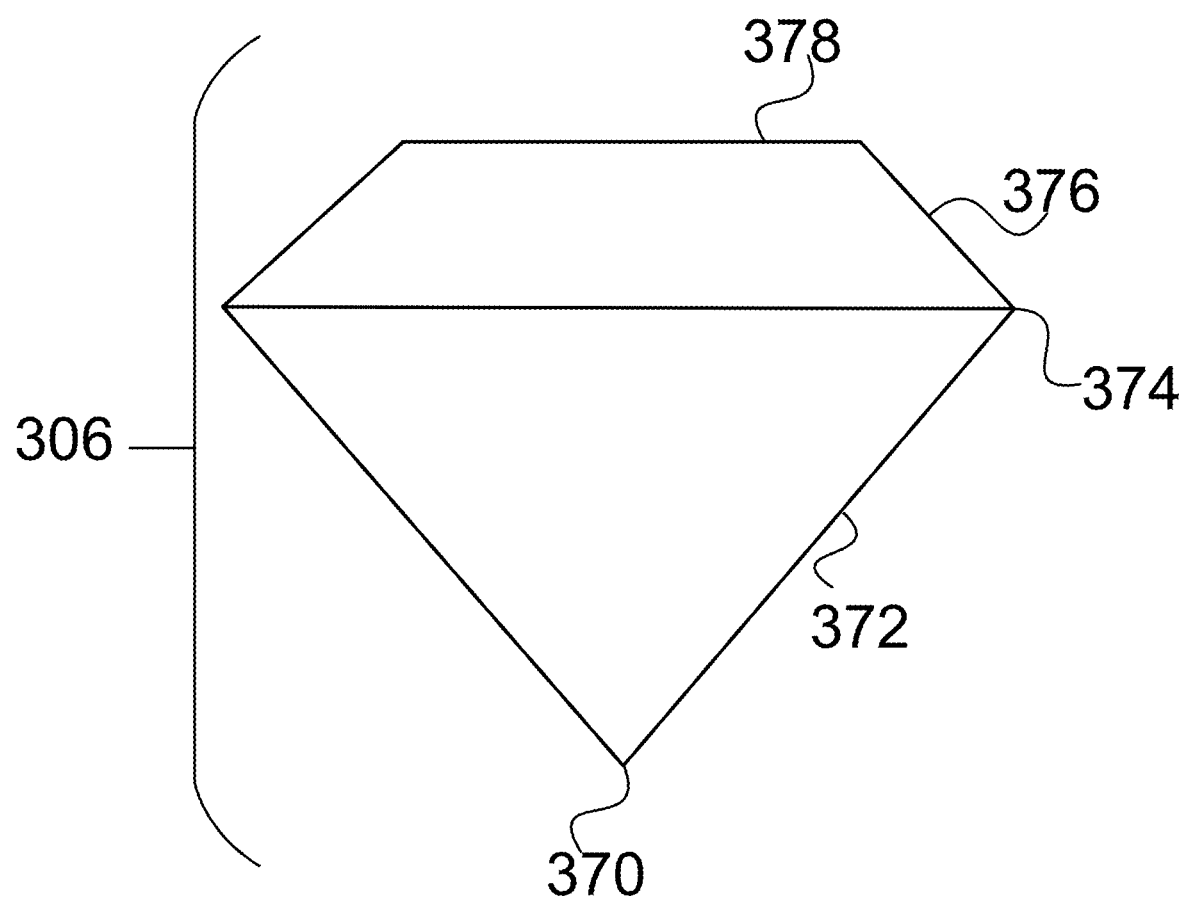
FIG. 3 is an illustration of an example gemstone in accordance with certain aspects described herein.

Turning to FIG. 3 which show a general diagram of an example gemstone 306. The gemstone may be cut to include certain example parts, as is common in jeweling. For example, the gemstone 306 may include a culet 370, a pavilion 372, a girdle 374, a crown 376 and a table 378. The table 278 may be a flat portion upon which the gemstone 306 may rest in a stable manner. It is on this table 378 that the gemstone may be placed on the stage (208 from FIG. 2A) in order to be analyzed by the illumination and imaging setup as described herein.

Turning back to FIG. 2A, the focal point for the emitted beam 210 is the interface between the stage 208 and gemstone 206 table 278. As the operator may simply place a new sample gemstone 206 on the stage 208 for analysis, table-side 278 down, this interface will always be the focal point, no matter what gemstone 206 is analyzed. The arrangement in FIG. 2A utilizes no other kind of holder, support, or adjustable braces for the sample gemstone 206 as it is merely placed on the flat surface of the stage 208. Therefore the operator would have no need to adjust the focus, maneuver any imaging systems, adjust illumination 202 or make any other adjustments to analyze a new sample gemstone. The arrangement in FIG. 2A may allow for quick and easy movement between samples and greatly simplifies the process for the operator, who otherwise would have to find a new focal point, and adjust hardware for analysis of each different stone sample.

One advantage of using a dichroic beam splitter in the system described here is that the overall system may be more compact than if such an arrangement were not used. The use of the dichroic beam splitter allows for the inbound beam 210 to the gemstone table 278 and the excited image 220 from the gemstone table 278 to pass through the same component part 230 which minimizes the amount of space that such an arrangement takes up on a laboratory table. Further, the arrangement eases the use by the operator who can manipulate, carry, maneuver, and/or rearrange a compact system more easily than a spread out one.

Continuing with FIG. 2A, once the emitted beam 210 traverses through the stage 208 and interfaces with the gemstone table 278, it excites a fluorescence image from the gemstone 206 table 278. That image then passes down 220, through the stage material 208 and back to the dichroic beam splitter 230. The dichroic beam splitter 230 may have different absorption coefficients for light polarized in different directions and may be used to selectively pass light of a small range of wavelengths while reflecting others. For example, this excited fluorescence light may be between 400-700 nm in wavelength. Since the excited fluorescence light from the gemstone 206 table 278, is of a particular wavelength (between 400 nm-700 nm) it may pass through the dichroic beam splitter 230 instead of reflect off it as the original deep UV beam 210 did. This allows the gemstone table 278 excited beam 220 to continue to an optional mirror 232 where it may be reflected again toward a lens 240 of a camera 242. The camera lens 240 may help to narrow the beam spot of the excited light 220 for better analysis. The camera 242 may be a light sensitivity color camera. In some example embodiments, an additional filter 241 may be placed before the lens 240 of the camera 242. In such examples, the additional filter 241 may enhance the contrast of the pattern or feature of a gemstone fluorescence image. The additional filter 241 may be any one of or combination of a long pass filter, a band-pass filter, a short-pass filter, and a polarization sensitive (combination of a polarizer and waveplate) filter.

This camera 242 may then digitally capture the emitted fluorescence image of the gemstone 206 for analysis as described herein. Such an image may include pixelated data representing the gemstone fluorescence image as described herein. The camera 242 may include computer components and may also be in communication with other computer components as described herein for processing the pixelated digital images, for saving, storing, sending, or otherwise analyzing or manipulating the pixelated digital images of the gemstone tables.

Example Image Capture Setups

FIG. 2A shows an example where the image stage may be placed in a physical environment that has a background that may interfere with the image capture. Such physical environments may be too bright, have the wrong color, or other physical characteristics that do not provide the best background for an image capture. To help remedy this and provide a better image capture background, an absorption material 250 may be placed in the back of the target stone 206, such as a diamond to improve the contrast of the growth pattern of the diamond for enhanced imaging. The absorption material 250 may be black in color, the absorption material may be made of putty, clay, polymer, moldable plastic, moldable foam, glue, adhesive, and/or other material. In some examples, alternatively or additionally, the absorption material may be mixed with black paint if it does not already possess opaque qualities. In some examples, alternatively or additionally, the black paint may be graphite paint. In some examples, alternatively or additionally, this material may be applied to the pavilion (See 372 in FIG. 3) or the back surface of the gemstone without an air gap. Alternatively or additionally, such a material may be placed on or behind the sample gemstone 206 other than the table 278 on a bubble, backdrop, shade, canopy or other arrangement to allow for images to be taken of sample gemstone tables that have reduced reflections, which may blur an image of the gemstone growth pattern. This arrangement may allow for better image analysis and comparisons than ones taken without the background absorption material 250 and the material may then be removed after analysis.

Figure 2B:
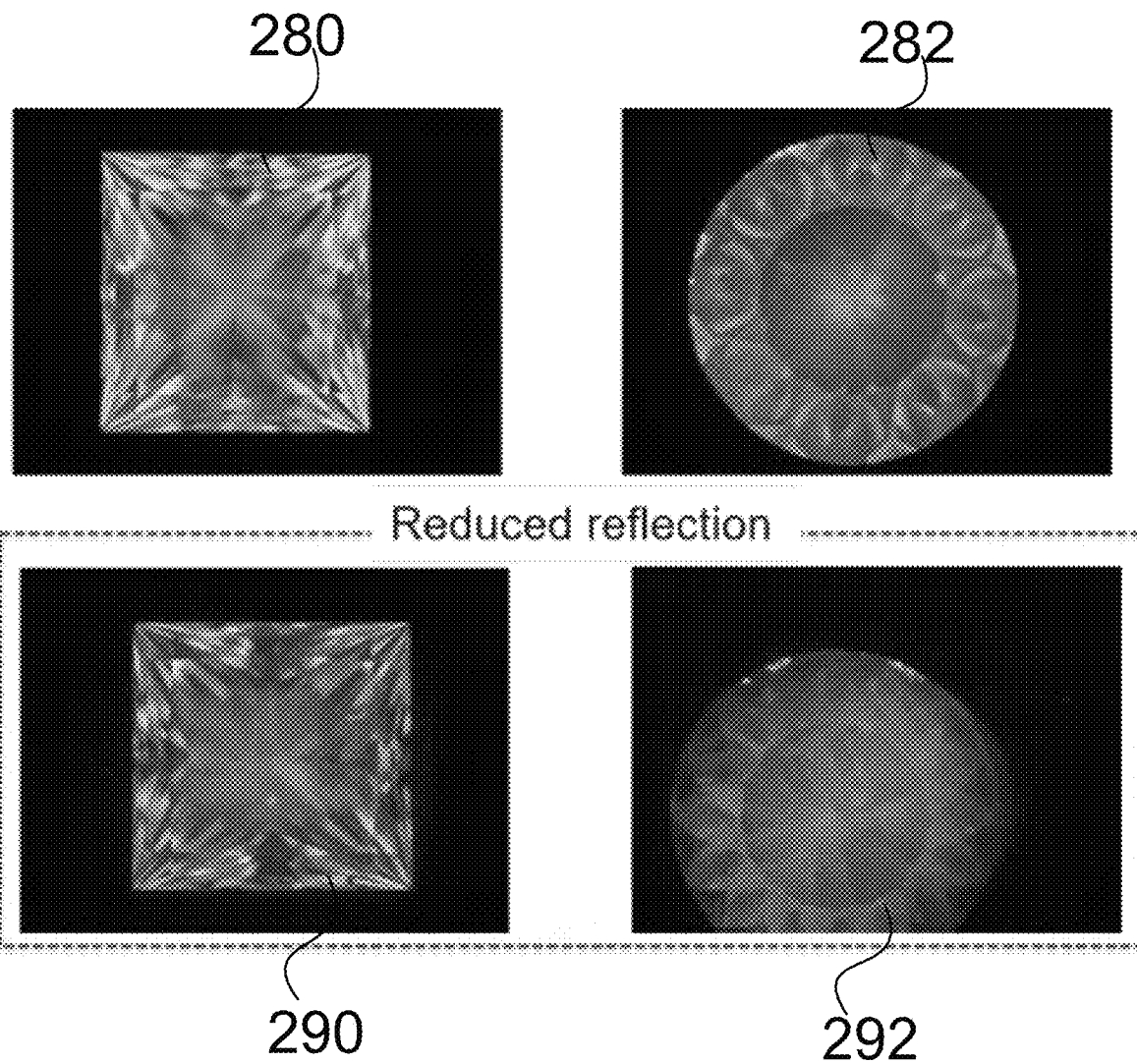
FIG. 2B are photographic examples of images taken in accordance with certain aspects described herein.

FIG. 2B shows photographic examples of the results of utilizing a material 250 in FIG. 2A to help reduce reflection in image capturing of gemstones. Such material may be applied to a gemstone to reduce reflection by blocking air between diamond and black material, making the existing patterns in the gemstones more clear. In FIG. 2B, the images of a sample gemstone 280, 282 without the applied material 250 in FIG. 2A, show more reflections in the image than those images 290, 292 which were taken with the material 250 in FIG. 2A applied to them. As can be seen, the reflections in the images 290, 292 with the material applied show many fewer reflections, and those shown are not as distinct or prominent. This may allow for better analysis of the gemstones and internal features.

In some examples a confocal arrangement may be made where a spatial pinhole may be arranged in a plate to block out fluorescence signals which are not from the gemstone table. Such arrangements may reduce the brightness of the image but may be useful in certain examples.

Application Examples

Various methods may be employed using the setup as described herein in FIG. 2A to accomplish different goals. One example method may use the setup described here to screen target gemstones such as diamonds to determine whether the diamond is synthetic. The setup described herein may be used to analyze the captured digitized pixelated fluorescence images. Such analysis may be used to detect diamond overgrowth on a natural diamond and detecting the absence of such overgrowth on a synthetic diamond. In such examples, the color of the fluorescence image may be used to detect overgrowth. For example, a diamond layer grown in a lab may generate a red color fluorescence instead of blue from a natural diamond. Also, such a layer may block the growth pattern of the natural diamond portion. Computer algorithms may be employed for such pixel analysis of the images. Such analysis may also include comparison analysis between saved images and captured images.

Figure 4:
FIG. 4 are photographic examples of images taken in accordance with certain aspects described herein.
Figure 4:
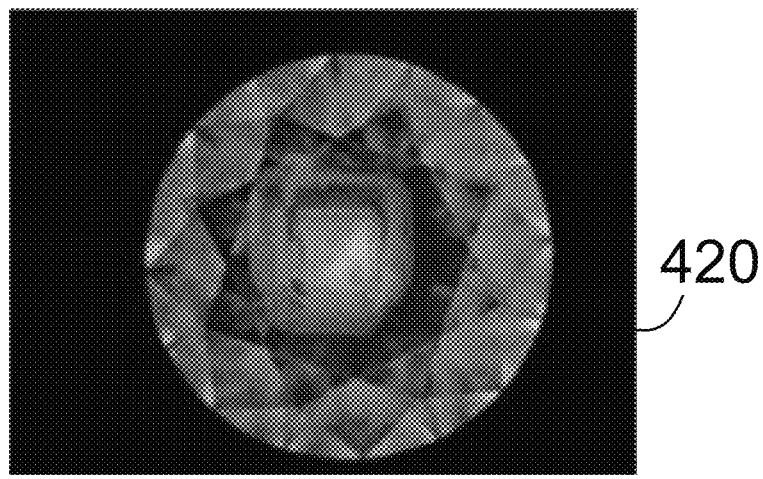

FIG. 4 shows examples of images taken using the systems and methods here. The first image 410 shows an example of synthetic growth over a natural diamond. Such synthetic growth could be Chemical Vapor Deposition (CVD), lab grown, or any other kind of synthetic diamond, grown on top of a natural diamond in order to make the diamond larger, increase weight, change the color, change the shape, or otherwise increase the value of the gemstone if the synthetic overgrowth is not detected. As can be seen in the image 410, the gemstone is not showing completely blue when subjected to the systems and methods described herein. Instead, the synthetic overgrowth appears as red or similar color and not blue, but an underlying natural diamond does appear blue. Additionally, in some examples, boundaries may be detected as lines of color in a gemstone with overgrown added by laboratory. Such boundary lines may appear as color changes, variations, or lines of color as shown 410 in FIG. 4. Any other kind of color inconsistency, variation, abnormality, or change at a boundary may appear in a gemstone that includes laboratory overgrowth if it is subjected to the systems and/or methods described herein. The examples of blue for natural and red for synthetic are not limiting.

The analysis of synthetic overgrowth of gemstones may be accomplished by image analysis including by computer algorithms. In some examples, artificial intelligence, machine learning, and/or neural networks may be trained on pixelated images taken from the systems in order to detect color abnormalities, variations, and/or boundaries in images of gemstones. By feeding such algorithms with many multiple examples, and adjusting the algorithms to aid in such detections, the adapted algorithms may be employed to detect synthetic overgrowth in new images.

FIG. 4 also shows a natural diamond 420 subjected to the systems and/or methods described herein. Such a natural diamond 420 includes appearance of a color attributed to natural gemstone, such as blue here for a diamond, without any color variations indicative of laboratory overgrowth. Additionally, another example method may utilize the systems and methods described herein is to analyze the growth pattern of a natural diamond in a captured, digital and/or pixelated image. Such example image captures may be saved in a database for later comparisons and identification of gemstones. Not unlike a fingerprint analysis and comparison, pixels of a captured image of a gemstone table may be analyzed and compared to a reference set of images for a match determination. Such a determination may be accomplished with a saved pixelated digital image of the fluorescence image of the table of the target stone, and by using a computing system, compare the pixels in a predetermined region of the captured image with a reference set of previously stored or saved pixelated images. Using comparison computing algorithms, a match may be determined between a pixelated reference set image and the captured pixelated image to determine whether the target stone had already been identified and imaged previously. In some examples, alternatively or additionally, the images are not pixelated, and an overlay of the reference images and the captured image may be utilized for the comparison steps.

The comparison of these growth patterns in naturally occurring gemstones may be accomplished by image analysis including by computer algorithms. In some examples, artificial intelligence, machine learning, and/or neural networks may be trained on pixelated images taken from the systems in order to detect growth patterns and compare a new image to stored images of already imaged gemstones. By feeding such algorithms with many multiple examples, and adjusting the algorithms to aid in matching, the adapted algorithms may be employed to match new images. In such a way, a new gemstone may be matched with a previously analyzed and saved gemstone image in order to determine a match. Such a match may allow for a grading or valuation service to recognize a gemstone that has been submitted more than once at different times. In some examples, even after polishing or cutting, a gemstone may be identified by its natural growth patterns because they are internally located.

Another example of identification could be to map and compare the cutting features of a gemstone. Cutting features may include a facet cut on any portion of the gemstone, and In some examples, alternatively or additionally, where two such facet features meet. Such an example could be used in lieu of, or in conjunction with, the other identification methods described herein. In such examples, boundaries between facet junction(s) may be imaged, stored, and used for comparison. In some examples such facet junctions may be called meets. In some examples, alternatively or additionally, a reflected pattern of a facet junction(s) could be used in a similar manner, to image, store, and compare against previously stored images.

Network Examples

Figure 5:
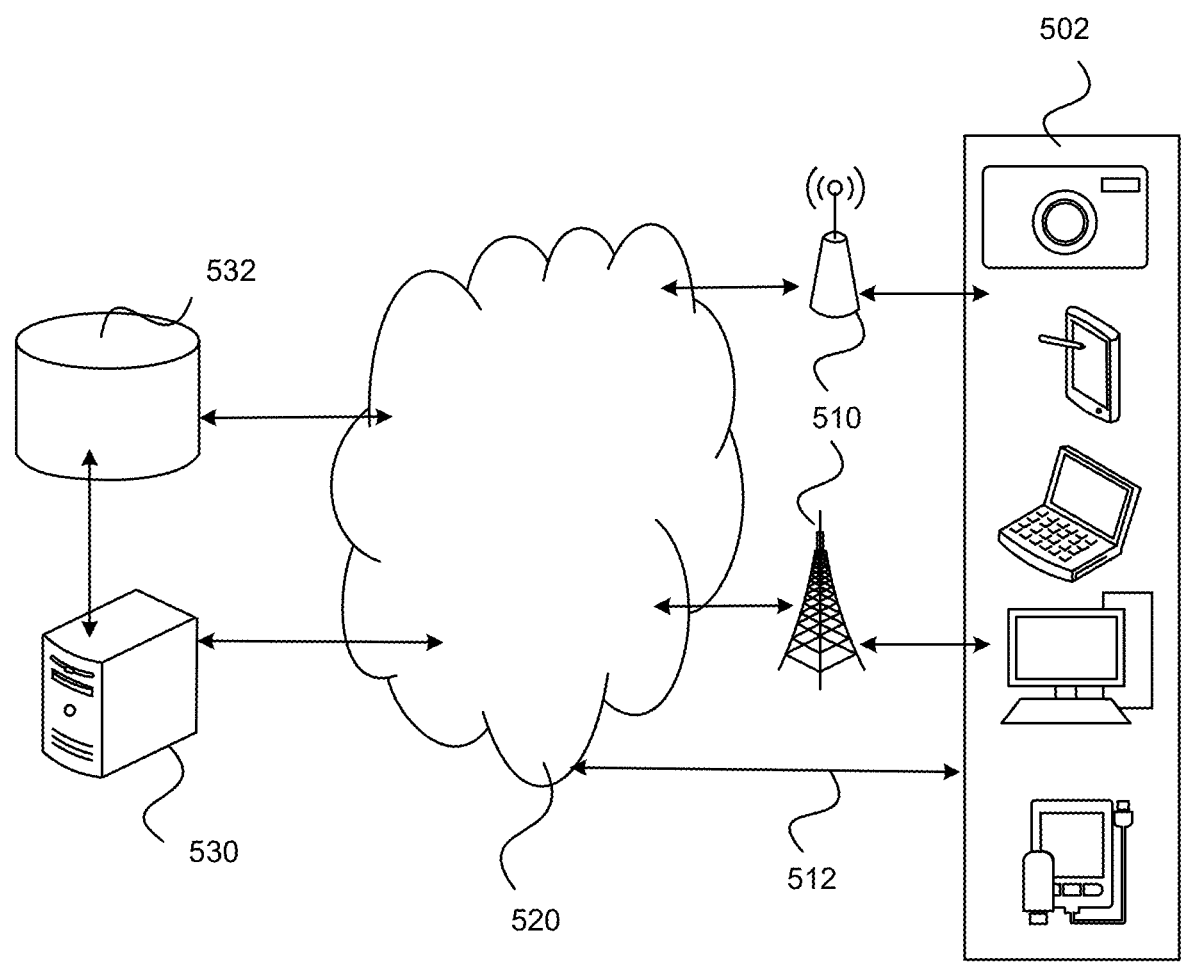
FIG. 5 is an illustration of an example networked system in accordance with certain aspects described herein.

An example of the networked computing arrangement is shown in FIG. 5. In FIG. 5, the computer 502 used to process the image from the camera (242 in FIG. 2A) may generate data which includes pixel data of the captured fluorescence image. The computer 502 could be any number of kinds of computers such as those included in the camera itself, and/or another computer arrangement in communication with the camera computer components including but not limited to a laptop, desktop, tablet, phablet, smartphone, or any other kind of device used to process and transmit digitized data. More examples are described in FIG. 5.

Turning back to FIG. 5, the data captured for the pixelated image from whichever computer 502 may be transmitted to a back end computer 530 and associated data storage 532 for saving and analysis. In some examples, alternatively or additionally, the transmission may be wireless 510 by a cellular or WiFi transmission with associated routers and hubs. In some examples, alternatively or additionally, the transmission may be through a wired connection 512. In some examples, alternatively or additionally, the transmission may be through a network such as the internet 520 to the back end server computer 530 and associated data storage 532. At the back end server computer 530 and associated data storage 532, the pixelated image data may be stored, analyzed, compared to previously stored image data for matching, or any other kind of image data analysis. In some examples, alternatively or additionally, the storing, analyzing, and/or processing of image data may be accomplished at the computer 502 which is involved in the original image capture. In some examples, alternatively or additionally, the data storing, analyzing, and/or processing may be split between the local computer 502 and a back end computing system 530. Networked computer resources 530 may allow for more data processing power to be utilized than may be otherwise available at the local computers 502. In such a way, the processing and/or storage of image data may be offloaded to the compute resources that are available. In some examples, alternatively or additionally, the networked computer resources 530 may be virtual machines in a cloud infrastructure. In some examples, alternatively or additionally, the networked computer resources 530 may be spread across many multiple computer resources by a cloud infrastructure. The example of a single computer server 530 is not intended to be limiting and is only one example of a compute resource that may be utilized by the systems and methods described herein.

Example Computer Devices

Figure 6:
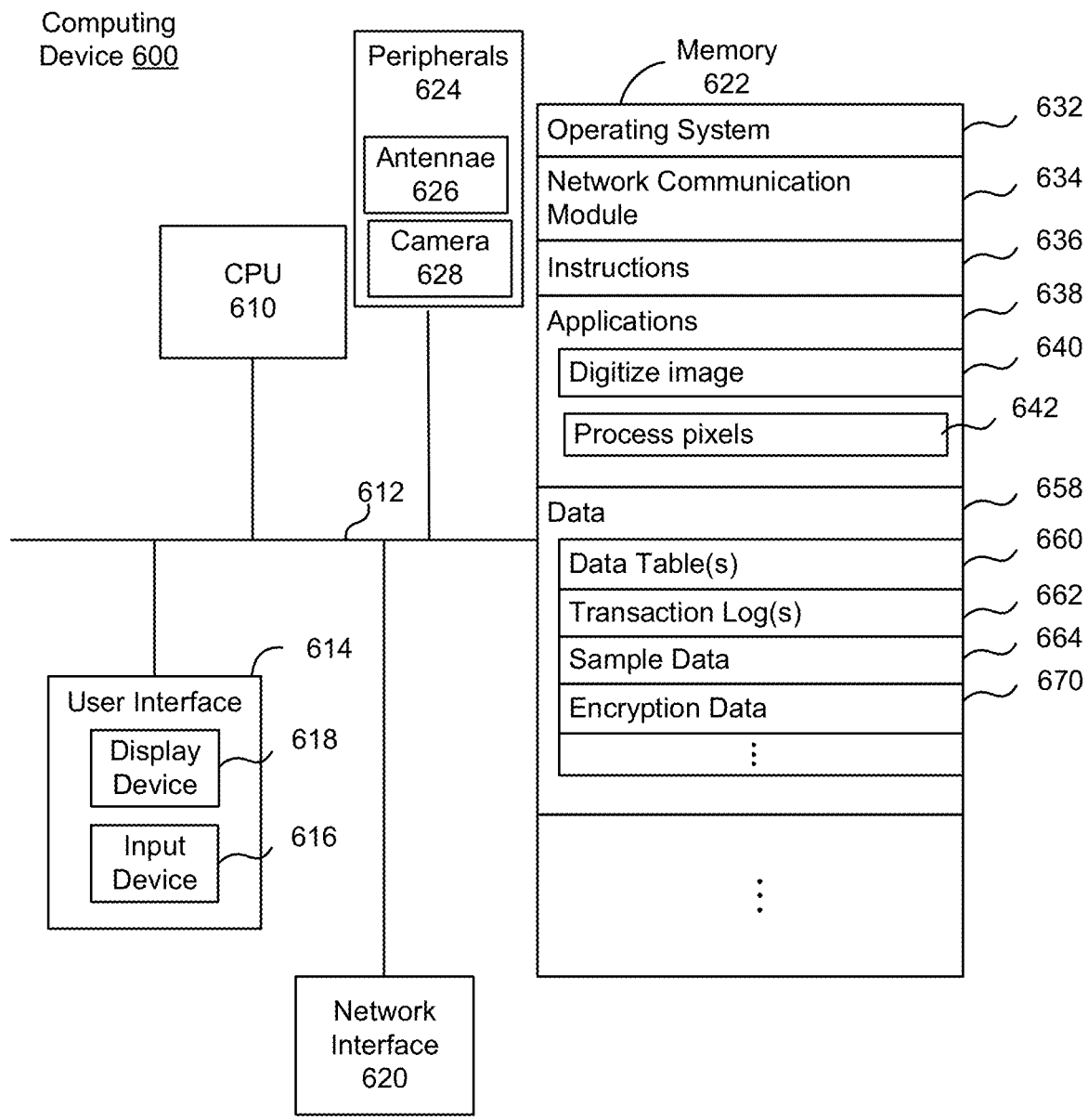
FIG. 6 is an illustration of an example computer system in accordance with certain aspects described herein.

FIG. 6 shows an example computing device 600 which may be used in the systems and methods described herein. In the example computer 600 a CPU or processor 610 is in communication by a bus or other communication 612 with a user interface 614. The user interface includes an example input device such as a keyboard, mouse, touchscreen, button, joystick, or other user input device(s). The user interface 614 also includes a display device 618 such as a screen. The computing device 600 shown in FIG. 6 also includes a network interface 620 which is in communication with the CPU 620 and other components. The network interface 620 may allow the computing device 600 to communicate with other computers, databases, networks, user devices, or any other computing capable devices. In some examples, alternatively or additionally, the method of communication may be through WiFi, cellular, Bluetooth Low Energy, wired communication, or any other kind of communication. In some examples, alternatively or additionally, the example computing device 600 includes peripherals 624 also in communication with the processor 610. In some examples, alternatively or additionally, peripherals include antennae 626 used for communication. In some examples peripherals 624 may include camera equipment 628. In some example computing device 600 a memory 622 is in communication with the processor 610. In some examples, alternatively or additionally, this memory 622 may include instructions to execute software such as an operating system 632, network communications module 634, other instructions 636, applications 638, applications to digitize images 640, applications to process image pixels 642, data storage 658, data such as data tables 660, transaction logs 662, sample data 664, encryption data 670 or any other kind of data.

Conclusion

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the descriptions pertains that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a general-purpose processor, the program code segments combine with the processor to provide a unique device that operates analogously to specific logic circuits.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A method of capturing and analyzing fluoresce images of a sample gemstone, the method comprising:
   generating a fluorescence exciting beam;
   directing the fluorescence exciting beam through a filter and to a dichroic beam splitter,
      wherein the dichroic beam splitter is configured to reflect wavelengths of the fluorescence exciting beam and pass wavelengths of excited fluorescence from the sample gemstone;
   receiving, at a camera with a computer processor and a memory, an excited fluorescence image from the sample gemstone resting table-side down on a sapphire stage, wherein the excited fluorescence image having passed through the dichroic beam splitter;
   digitizing, by the camera computer, the received fluorescence image of the sample gemstone; and
   sending, by the camera computer, the digitized image of the sample gemstone table to a computer data storage.

2. The method of claim 1 further comprising, by a back end computer with a processor and a memory, comparing a second digitized image to the stored digitized image and determining a match for identification.

3. The method of claim 1 further comprising, analyzing, by a back end computer with a processor and a memory, the stored digitized image for determination of whether the sample gemstone is a natural or synthetic diamond.

4. The method of claim 1 wherein the directed, filtered beam has a wavelength of between 200 nm and 250 nm.

5. The method of claim 1 wherein the directed, filtered beam has a wavelength of about 224 nm.

6. The method of claim 1 wherein the generating of a fluorescence beam is by a Xenon flash lamp.

7. The method of claim 1 wherein the excited fluorescence image from the sample gemstone resting table-side down on a sapphire stage has a wavelength between 400 nm and 700 nm.

8. The method of claim 2 wherein the comparing of the second digitized image to the stored digitized image and determining a match for identification is a comparison of a subset of pixels in the full digitized images.

9. The method of claim 1 wherein the excited fluorescence image from the sample gemstone resting table-side down on a sapphire stage, is also reflected off a mirror before being received at the camera and after passing through the dichroic beam splitter.

10. The method of claim 1 wherein the dichroic beam splitter is configured to reflect wavelengths less than 300 nm and pass wavelengths greater than 300 nm.

11. The method of claim 1 wherein the filter through which the fluorescence exciting beam is filtered includes a polarization sensitive filter.

12. The method of claim 1 wherein the sample gemstone is backed by a light absorbing material to reduce reflections.

13. The method of claim 1 further comprising, by a back end computer with a processor and a memory, analyzing the digitized image for color variation and boundary color detection to identify a synthetic overgrowth.

14. A system to analyzing fluoresce images of a sample gemstone, the system comprising:
   a light generator for creating a beam capable of exciting fluorescence in a gemstone;
   a dichroic beam splitter, configured to reflect wavelengths from the light generator and pass wavelengths from fluorescence excitation of the sample gemstone,
      wherein a lens and a filter are configured to focus and filter the beam from the light generator which is aimed at the dichroic beam splitter;
   a flat stage capable of transmitting both ultraviolet and visible light, the flat stage configured to support a table of the sample gemstone and receive reflected beams from the dichroic beam splitter;
   a camera configured to focus on an interface of the table of the sample gemstone and the flat stage, and receive excited fluorescence images from the sample gemstone table through the dichroic beam splitter and generate a digitized image of the sample gemstone table.

15. The system of claim 14 wherein the beam created by the light generator has a wavelength of between 200 nm and 250 nm.

16. The system of claim 14 wherein the beam created by the light generator has a wavelength of about 224 nm.

17. The system of claim 14 further comprising a computer system in communication with the camera wherein the computer system is configured to receive and store the digitized image of the sample gemstone table.

18. The system of claim 17 wherein the computer system is further configured to determine whether the sample gemstone table is natural or synthetic based on the digitized image.

19. The system of claim 17 wherein the computer system is further configured to compare the digitized image of the sample gemstone table with stored digitized images of other gemstone tables and determine a match for identification based on compared pixels in the images.

20. The system of claim 14 further comprising a mirror, configured between the camera and the dichroic beam splitter, the mirror configured to reflect the excited fluorescence images into the camera.

21. The system of claim 14 wherein the dichroic beam splitter is configured to reflect wavelengths less than 300 nm and pass wavelengths greater than 300 nm.

22. The system of claim 14 further comprising a polarization sensitive filter configured to filter the light beam from the light generator.

\* \* \* \* \*